J. TURL.
Sugar-Mold Tips.
No. 17,409.
Patented May 26, 1857.
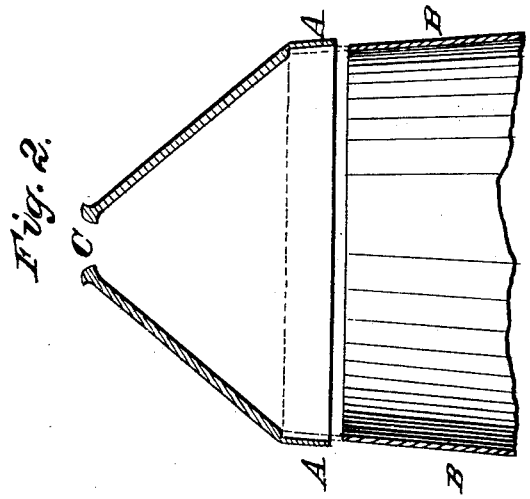
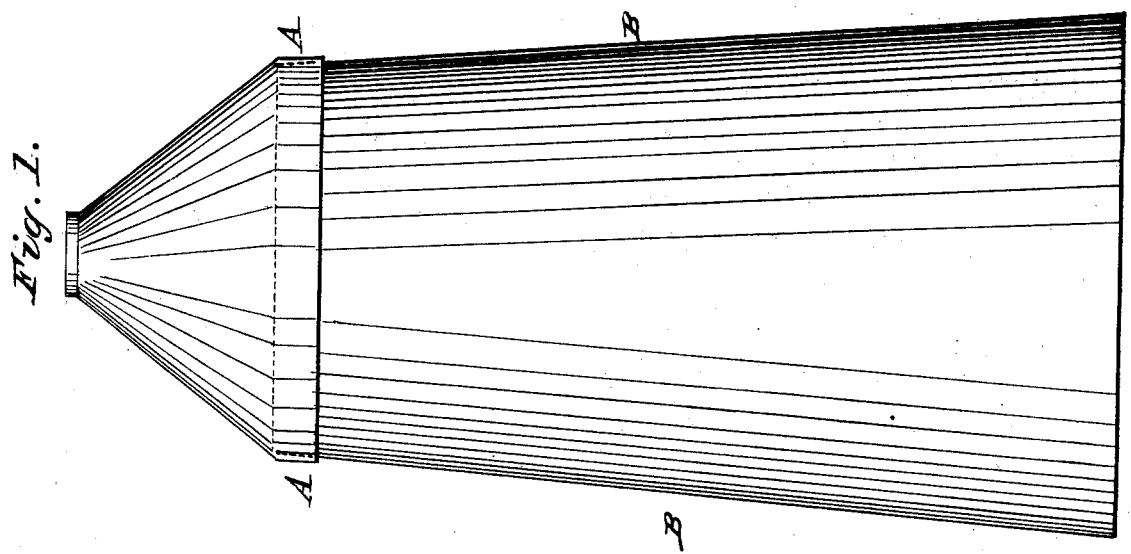
Witnesses:
Inventor:

UNITED STATES PATENT OFFICE.

JOHN FURL, OF NEW YORK, ASSIGNOR TO SAMUEL FURL, OF BROOKLYN, NEW YORK.

IMPROVEMENT IN TIPS FOR SUGAR-MOLDS.

Specification forming part of Letters Patent No. 17,409, dated May 26, 1857.

*To all whom it may concern:*

Be it known that I, JOHN FURL, of the city of New York, in the county and State of New York, have invented a new and Improved Method of Constructing the Tips of Sugar-Molds; and I do hereby declare that the following is a full, clear, and exact description of the same, reference being had to the annexed drawings, making a part of this specification, as follows:

Figure 1 is an elevation of the outside. Fig. 2 is the upper and lower parts prepared for putting together.

The same marks of reference denote the same part in both the figures of the drawings.

The nature of my invention consists in providing a tip or bottom part of a sugar-mold with a double conical mouth for the delivery of the drippings, in combination with a recess at the opposite or larger end of the tip, in which recess is to be fitted the sheet metal to form the upper part of the mold, the tip itself being forged in one piece of wrought metal.

To enable others skilled in the art to make and use my invention, I will proceed to describe the method of constructing the same.

Having provided male and female dies of proper forms each to match the other, I proceed to cut from plate-metal a disk with a hole in its center. I next have other dies to match each other, which will form the disk into a cone. I next proceed to place in the opening at the center of the cone a plug of metal, which nearly fills the opening. This is then welded in its place by repeatedly heating and submitting it to the action of the dies under pressure, or, what is preferable, to repeated hammering under a drop-press. Thus the complete welding is effected at the tip of the conic form, and the recess at the opposite end is formed at the same time. The solid piece at the tip is then drilled out conical in opposite direction to the main opening or interior of the mold.

The recess at the top of the tip A is to receive the sheet metal or upper part of the mold B in such manner as to form an even and unbroken surface to the inside of the mold, as any roughness or opening would allow the adhesion of the pressed sugar-loaf, so that it would break in being taken from the mold. The two parts A and B are united in the usual manner by rivets or otherwise, the depth or thickness of the recess being precisely equal to the thickness of the sheet metal, so that the whole will present the desired even surface. The point of the tip or drip is formed in the shape of two female cones joined at the apex, (see C in drawings,) the object of this peculiar form being adopted the better to admit the thick sirup to drop while dripping, as well as the better to hold securely the plug when this opening is to be closed. Great strength is necessary at this point, as the plug must be driven in very tight. Cast metal proves unequal to this in point of economical endurance, while the more expensive metals than iron are too costly. It is therefore an important matter, as well in usefulness as economy. As all the real labor of the work comes upon this point, it is a very great improvement in every sense to have a solid forged tip to the molds.

Having thus fully described the method of constructing my tips and their advantage over others, I wish it distinctly understood that I do not claim the substitution of the wrought-iron for cast-iron in making the tips of sugar-molds; but

What I do claim as my invention, and desire to secure by Letters Patent, is—

The construction of the tip with a recess to receive the body of the mold, and with a conical mouth opening in a contrary direction to the regular conical form of the interior of the mold, when made in the manner substantially as herein set forth, and for the purpose described.

JOHN FURL.

Witnesses:
J. L. KINGSLEY,
C. S. NEWELL.